United States Patent [19]
Bidol

[11] 3,894,855
[45] July 15, 1975

[54] COMPRESSOR INLET FILTER

[75] Inventor: Michael K. Bidol, Dearborn Heights, Mich.

[73] Assignee: Tecumseh Products Company, Tecumseh, Mich.

[22] Filed: Jan. 28, 1974

[21] Appl. No.: 437,375

[52] U.S. Cl. .................. 55/385; 55/373; 55/378; 55/498; 55/DIG. 26; 417/312; 210/416
[51] Int. Cl. ............................................. F04b 49/00
[58] Field of Search ............ 55/361, 373, 374, 378, 55/369, 490, 495, 498, 500, 502, 511, 525, DIG. 5, DIG. 16, DIG. 26, DIG. 31, DIG. 2, 497, 362, 505, 385, 467, 468, 470, 472, 507, 508, 469; 4/190, 287, 288, 292, 295; 210/448, 416; 417/312

[56] References Cited
UNITED STATES PATENTS

| | | |
|---|---|---|
| 1,155,852 | 10/1915 | Westergren .................. 210/448 X |
| 2,565,764 | 8/1951 | Flanagan ........................ 55/467 X |
| 2,847,835 | 8/1958 | Cooper et al. ................ 210/448 X |
| 3,241,747 | 3/1966 | Mihalakis ....................... 55/467 X |
| 3,676,024 | 7/1972 | Akaiki et al. .................. 55/467 X |

FOREIGN PATENTS OR APPLICATIONS

| | | |
|---|---|---|
| 49,166 | 3/1911 | Austria ............................. 210/448 |

*Primary Examiner*—Frank W. Lutter
*Assistant Examiner*—David L. Lacey
*Attorney, Agent, or Firm*—Barnes, Kisselle, Raisch & Choate

[57] ABSTRACT

A compressor filter wherein a filter bag made of a fine mesh screen with an open end is frictionally retained in an annular carrier to provide a unitary subassembly which is then forced into firm frictional engagement with a tapered side wall of a suction inlet passageway to permanently mount the filter assembly in the compressor and further augment the retention of the bag in the carrier.

16 Claims, 7 Drawing Figures

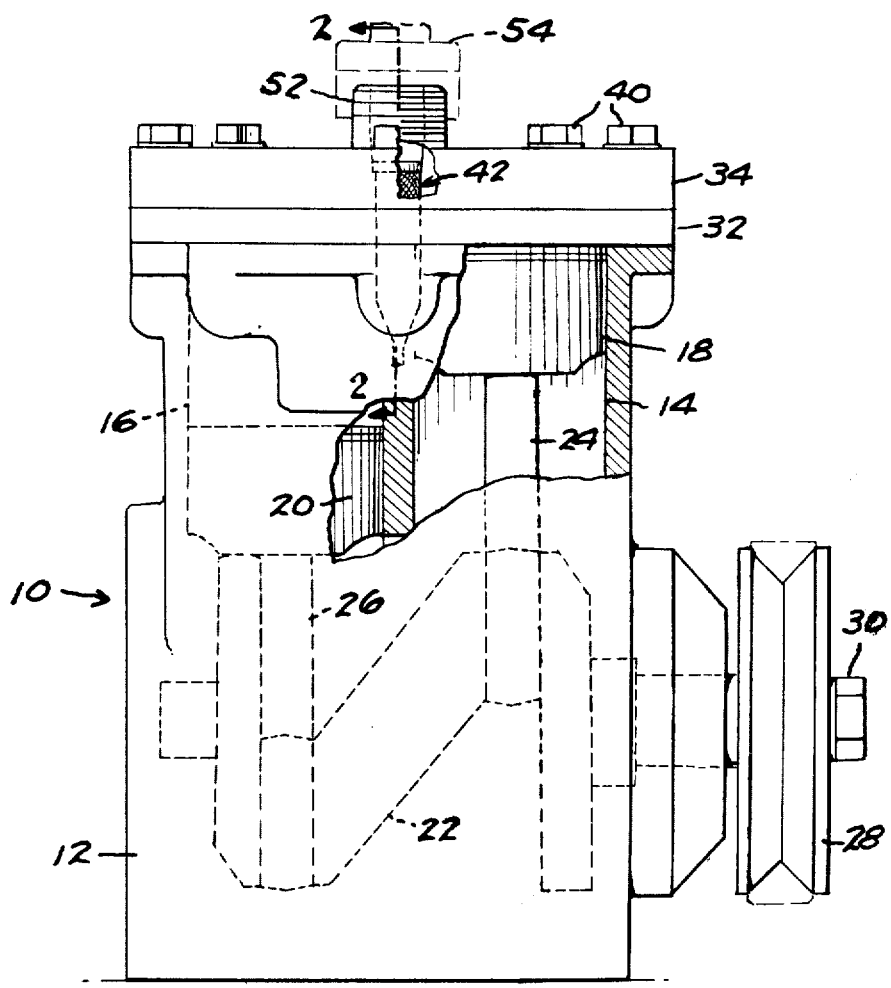
FIG. 1
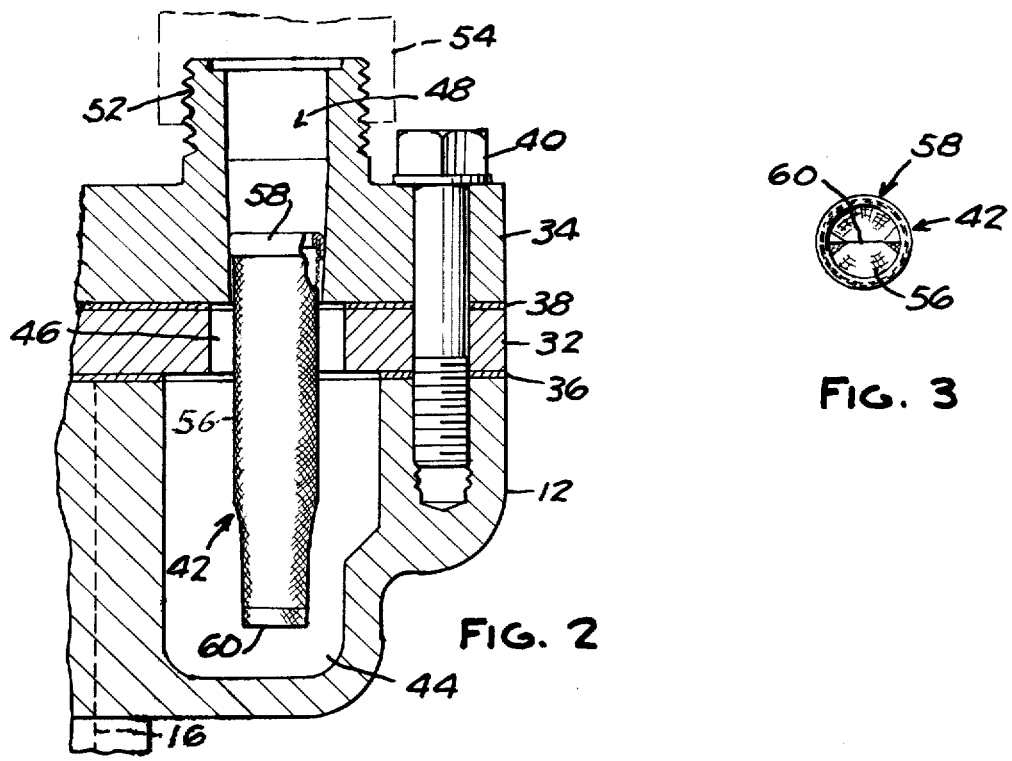
FIG. 2
FIG. 3

COMPRESSOR INLET FILTER

This invention relates to compressors and more particularly to a compressor suction inlet filter and method of assembling the same.

It has been customary in certain types of compressors, such as in automotive air conditioning compressors, to provide a filter assembly in the suction passageway of the compressor to screen out and collect any metal particles which may remain after the manufacturing and final wash operations so that such particles do not damage the valves or bearings of the compressor. One such prior art filter assembly comprises a wire mesh screen formed into a bag and soldered at its open end to a brass ring. A generally radially extending flange of the ring is received in a counterbore in the upper face of a valve plate of the compressor and retained therein by an overlying sealing gasket and cylinder head, thereby removably mounting the filter assembly in the suction inlet of the compressor. One disadvantage of this type of filter assembly is the necessity of maintaining extremely close dimensional control of the depth of the counterbore and thickness of the radial flange in order to prevent axial vibration or lateral oscillation of the mounting ring in the counterbore when the compressor is running, a condition which could occur if the counterbore has a depth greater than the thickness of the radial flange of the ring. It has been found that such a condition can lead to disintegration of portions of the soldered joint and the screen of the filter assembly into small particles which may enter the compressor valves and bearing and damage the compressor.

Accordingly, an object of this invention is to provide an improved filter screen assembly for a compressor which overcomes the aforementioned loose mounting problem so that the filter is not subject to becoming loose in service and thus liable to disintegration, thereby avoiding damage to the compressor. Another object is to provide an improved compressor inlet filter screen assembly which does not require close dimensional control in the manufacture thereof, is easily and economically manufactured and assembled, is service and maintenance free and has a long, useful life. A further object is to provide a method of assembling a filter which is readily accomplished in two stages, the second stage being performed simultaneously with mounting of the filter screen assembly in the compressor.

These and other objects, features and advantages of this invention will be apparent from the following description, appended claims and accompanying drawings, in which:

FIG. 1 is a side view of a compressor embodying this invention with portions broken away to illustrate some of the component parts thereof.

FIG. 2 is an enlarged fragmentary sectional view on line 2—2 of FIG. 1.

FIG. 3 is a plan view of the filter assembly of the compressor of FIG. 1.

Figure 4:
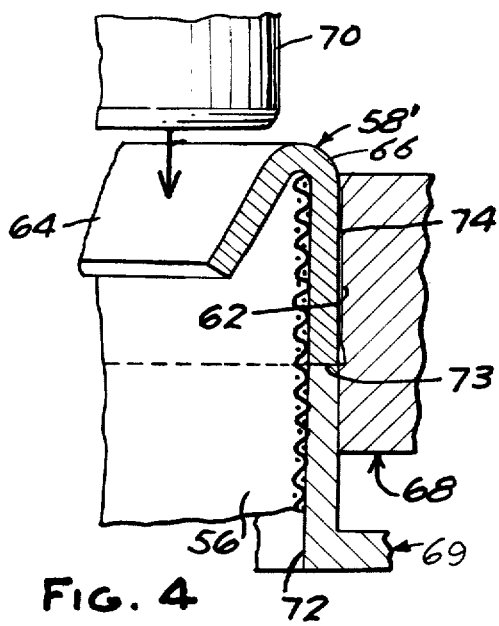
FIG. 4 is an enlarged fragmentary sectional view of suitable tooling for crimping a carrier of the filter assembly to a filter bag thereof.

Referring in more detail to the drawings, FIG. 1 illustates an automotive air conditioning compressor 10 embodying this invention with a block 12 having cylinders 14 and 16 therein. Pistons 18 and 20 are reciprocated in cylinders 14 and 16 by a crankshaft 22 journalled for rotation in block 12 and connected to the pistons by connecting rods 24 and 26. A drive pulley 28 is secured to crankshaft 22 by a lock nut 30. A valve plate assembly 32 with inlet and outlet vales therein (not shown), a cylinder head 34 and suitable gaskets 36 and 38 (FIG. 2) overlie cylinders 14 and 16 and are secured to block 12 by bolts 40.

As shown in FIG. 2, a filter assembly 42 is received in the suction inlet passageway of compressor 10 through which gases pass to the inlet valves of the compressor. The compressor suction inlet passageway is formed in part by a pocket 44 in crankcase 12, a bore 46 through valve plate assembly 32, and an inlet passage 48 with a tapered side wall 50 extending through a threaded inlet nipple 52 integral with cylinder head 34. An inlet hose coupling 54 shown in phantom is received on suction inlet nipple 52 to supply a refrigerant gas to the inlet of the compressor.

Figure 5:
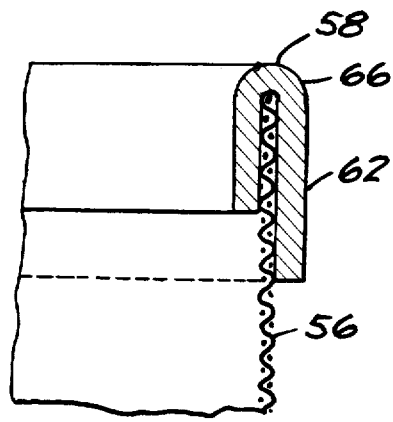
FIG. 5 is an enlarged fragmentary sectional view illustrating the carrier of the filter assembly secured to the filter bag thereof.

As shown in FIGS. 2, 3 and 5, filter assembly 42 comprises a long and narrow tubular bag 56 secured at its open upper end to an annular carrier 58. Bag 56 of filter assembly 42 is made of a fine mesh screen of stainless steel wire and has a folded lower end 60 which is welded shut. Carrier 58 is preferably a one-piece annular member having a generally U-shaped cross section with side wall ring portions 62 and 64 interconnected by an integral return bend or bight portion 66 overlying the open end of bag 56. As shown in FIG. 5, the upper open end of bag 56 is crimped or firmly frictionally received between outer and inner side wall ring portions 62 and 64 respectively of carrier 58.

In accordance with the method of the invention, the assembly of bag 56 to carrier 58 by crimping the upper end of bag 56 between portions 62 and 64 is preferably accomplished in two stages, the first stage being performed by an appropriate two-piece die 68 and 69 and punch 70 as shown in FIG. 4. Die 69 has a bore 72 through which the upper end of bag 56 is received, and die 68 has a larger bore 74 in which the upper end of die 69 is slightly telescoped, and which also receives with a clearance fit a partially formed carrier 58' with the inner surface of outer ring 62 flush with bore 72. The upper end of bag 56 is inserted between the outer and inner rings 62 and 64 of carrier 58' until it abuts crimp 66. Then, while dies 68 and 69 are held stationary, with the lower edge of ring 62 seated on the upper edge 73 of die 69, punch 72 is extended downwardly into die 68 to further bend bight portion 66 so that inner wall portion 64 extends generally axially of outer wall portion 62 and firmly crimps or frictionally engages the upper end of bag 56 between side wall ring portions 62 and 64 as shown in FIG. 5. In this condition, carrier 58 and bag 56 need only be temporarily retained in a unitary subassembly with a mild frictional interengagement which is merely sufficiently secure to permit rapid ejection of the subassembly from the die set, as by upward movement of die 69 until edge 73 is flush with the upper end of bore 74, as well as subsequent handling and shipment to the point of compressor assembly.

In the second stage of the method, filter assembly 42 is initially loosely assembled in compressor 10 by dropping the filter assembly axially downwardly into inlet passage 48 in cylinder head 34, and then carrier 58 is forced into firm frictional engagement with tapered side wall 50 to fixedly retain the filter assembly in the compressor while simultaneously increasing the forces retaining bag 56 in carrier 58.

Figure 6:
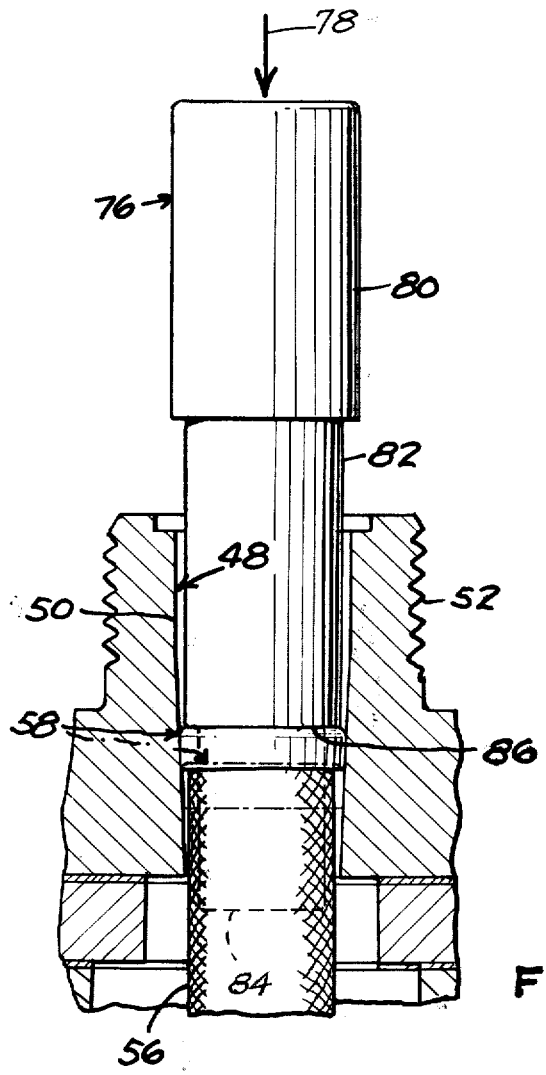
FIG. 6 is an enlarged fragmentary sectional view of the compressor of FIG. 1 illustrating a preferred but exemplary tool and procedure used to secure the filter assembly in the suction inlet passage of the compressor.

Thus, as shown in FIG. 6, filter assembly 42 is first dropped bag end first into passage 48 until carrier 58 hangs up on tapered side wall 50 (solid line position shown in FIG. 6). The cylindrical bag 58 serves as a pilot during such initial insertion which maintains carrier 58 oriented coaxially with tapered side wall 50; i.e., so that carrier 58 comes to rest without canting or tipping. Then carrier 58 may be forced into firm frictional engagement with tapered side wall 50 of inlet passage 48 by striking a suitable assembly tool 76 with a hammer (not shown) to apply, either manually or mechanically in an assembly press, a force thereto in the direction of arrow 78. Tool 76 has a head 80, a shank 82 which may be extended into inlet passage 48, a pilot 84 over which carrier 58 is received with a loose sliding fit and a shoulder 86 adapted to bear on the carrier. The force so applied by striking tool 76 has a given minimum value correlated with the taper of side wall 50 such that carrier 58 is moved further downwardly onto side wall 50 to the fully assembled position shown in phantom in FIG. 6.

Figure 7:
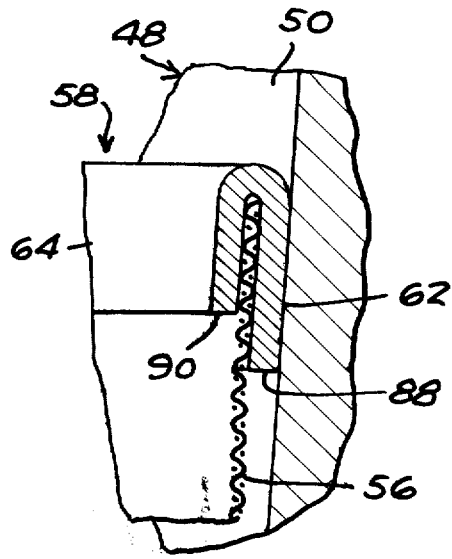
FIG. 7 is an enlarged fragmentary sectional view of the filter assembly secured in the suction inlet passage of the compressor.

As shown in FIG. 7, when carrier 58 of filter assembly 42 is so forced by tool 76 into firm frictional engagement with tapered side wall 50, the gradually diminishing diameter of tapered side wall 50 squeezes the side wall portions 62 and 64 of the carrier so that they are both canted generally radially inwardly to extend parallel with tapered wall 50. This squeezing action also increases the compression force exerted by outer ring 62 on the upper portion of bag 56 which is resisted by the inner ring 64 which now serves as a reinforcing hoop. Side wall 50 is preferably formed with a locking taper angle relative to carrier 58 so that forcing carrier 58 into firm engagement with tapered wall 50 permanently fixes filter assembly 42 in inlet passage 48. Tapered side wall 50 is made sufficiently long so that its least diameter is small enough to allow a relatively high upper limit of insertion force to be employed without danger of carrier 58 being forced downwardly out of tapered side wall 58.

The compression or squeeze force thus generated during final assembly also simultaneously increases the crimping stresses which frictionally retain the upper end of bag 58 between the outer and inner wall portions 62 and 64 of carrier 58, thereby firmly and permanently securing bag 56 to the carrier. Preferably, the lower edge 88 of outer wall portion 62 of carrier 58 extends below the lower edge 90 of inner wall portion 64 to further enhance the retention of bag 56 in carrier 58.

By way of illustration, and not by way of limitation, in one successful working model of a compressor and filter screen assembly constructed pursuant to the present invention, the following dimensions, materials and values were employed:

| | |
|---|---|
| Axial dimension of tapered wall 50 | 0.515–0.765 inch |
| Largest diameter of wall 50 | 0.571–0.579 inch |
| Smallest diameter of wall 50 | 0.494–0.506 inch |
| Included angle of taper of wall 50 | 5°–7° |
| Free-state outside diameter of outer ring 62 of carrier 58 | 0.536–0.540 inch |
| Radial thickness of ring 62 | 0.017–0.023 inch |
| Axial length of ring 62 | 0.130–0.160 inch |
| Axial distance of movement of carrier 58 between loose engagement and final assembled positions in passage 48 | 0.048–0.101 inch |
| Range of forces applied to carrier 58 to drive the same from the loose engaged to final assembled positions in passage 48 | 150–400 lbs. |
| Material of screen of bag 56 | stainless steel wire cloth |
| Material of carrier 58 | tin plated steel |
| Material of passageway 48 | G–3000 cast iron |

When compressor 10 is operating with a filter assembly 42 therein embodying this invention, the firm frictional locking engagement of carrier 58 with tapered wall 50 of inlet passage 48 prevents removal of the filter in either direction axially of the filter, and also prevents the filter assembly from oscillating in the passage. Hence, the filter is securely locked in place and the assembly 42 does not tend to disintegrate into particles which could enter the compressor valves and bearings and thereby damage the compressor. Filter assembly 42 is economical to manufacture and assemble since it has only two component parts. The filter bag may be initially secured to the carrier by only mild frictional engagement therewith without the need for a soldered joint. The filter assembly may be readily and economically assembled in a compressor by the use of a small hammer imparting a single impact to a simple hand assembly punch or tool, and within wide limits of insertion force, for example, from 150 to 450 pounds. Moreover, both the filter assembly and the tapered side wall of the compressor suction inlet can be economically produced since close dimensional control thereof is unnecessary to enable the filter assembly to be permanently fixed in the inlet passage of the compressor. Although the firm frictional engagement of the carrier with the tapered side wall of the suction inlet passage permanently fixes the filter assembly in the compressor and thus provides a service and maintenance free compressor inlet filter arrangement, should bag 56 become clogged with particles the filter assembly 42 can be removed for servicing by use of a suitable service tool with a compressible hook end adapted to be inserted downwardly into the open upper end of the filter assembly so as to hook under edge 90 of the inner ring portion 64, whereupon the filter can be pulled upwardly out of bore 50 applying sufficient upward force to the service tool.

I claim:

1. In a compressor having a suction inlet passage through which gases flow the combination comprising a tapered conical side wall in said inlet passage and extending between first and second axially spaced portions thereof, an annular carrier disposed in firm frictional engagement with said tapered side wall of said inlet passage to frictionally retain said annular carrier in fixed relation in said inlet passage, said carrier being compressed by said side wall when frictionally retained in said inlet passage and having an outside diameter intermediate the diameter of said first and second portions in both the compressed and uncompressed conditions thereof, and a tubular filter bag open at one end and closed at the axially opposite end, said open end of said bag being fixed to said annular carrier such that said annular carrier positions said bag in said inlet passage with the bag extending from said annular carrier in the direction of convergence of said tapered side wall, whereby gases flowing through said inlet passage will pass through said filter bag.

2. The assembly of claim 1 wherein said inlet passage has a taper converging in the direction of gas flow in said inlet passage.

3. The assembly of claim 1 wherein said tapered side wall is disposed at a locking angle relative to said carrier in the frictionally retained position thereof to prevent movement of said carrier in either direction axially of said tapered side wall of said inlet passage.

4. The assembly of claim 1 wherein said diameter of said second portion of said tapered side wall of said inlet passage is sufficiently smaller than the outside diameter of said carrier in the compressed condition thereof to prevent said carrier from being forced through said inlet passage in the direction of convergence of said tapered side wall by a relatively high insertion force applied to said carrier in the direction of convergence of said tapered side wall.

5. The assembly of claim 1 wherein said suction inlet passage is in the cylinder head of the compressor and opens into a chamber in the cylinder block of the compressor through a valve plate interposed between the head and the block, and said carrier when frictionally retained in said inlet passage positions said bag so that it extends through said valve plate with the closed end thereof received in said chamber.

6. The assembly of claim 1 wherein said annular carrier comprises an outer ring and a generally coaxial inner ring which lap each other at least when said annular carrier is frictionally retained in said inlet passage, said outer ring being adapted for firm frictional engagement with said tapered side wall of said inlet passage, said open end of said filter bag being received and frictionally retained between said inner and outer rings of said carrier to fix said filter bag to said carrier.

7. The assembly of claim 6 wherein said annular carrier comprises a one-piece member having a return bend portion integrally interconnecting said inner and outer rings such that said one-piece member has a generally U-shaped cross section through said rings and bend portion.

8. The assembly of claim 7 wherein said annular carrier comprises a metallic material.

9. The assembly of claim 7 wherein said bag comprises a fine mesh screen.

10. The assembly of claim 9 wherein said fine mesh screen comprises metallic wires.

11. The assembly of claim 7 wherein said filter bag is fixed to said carrier only by being frictionally received between said inner and outer rings of said annular carrier.

12. The assembly of claim 7 wherein the lower edge of said outer ring extends beyond the lower edge of said inner ring to enhance retention of said filter bag between said rings when said carrier is frictionally retained in said inlet passage.

13. The filter assembly of claim 6 wherein said inner and outer rings are metallic rings.

14. The assembly of claim 6 wherein said filter bag is fixed to said carrier only by being frictionally received between said inner and outer rings of said annular carrier.

15. The assembly of claim 6 wherein the lower edge of said outer ring extends beyond the lower edge of said inner ring to enhance retention and said filter bag between said rings when said carrier is frictionally retained in said inlet passage.

16. The assembly of claim 15 wherein said suction inlet passage is in the cylinder head of the compressor and opens into a chamber in the cylinder block of the compressor through a valve plate interposed between the head and the block, and said carrier when frictionally retained in said inlet passage positions said bag so that it extends through said valve plate with the closed end thereof received in said chamber.

* * * * *